UNITED STATES PATENT OFFICE.

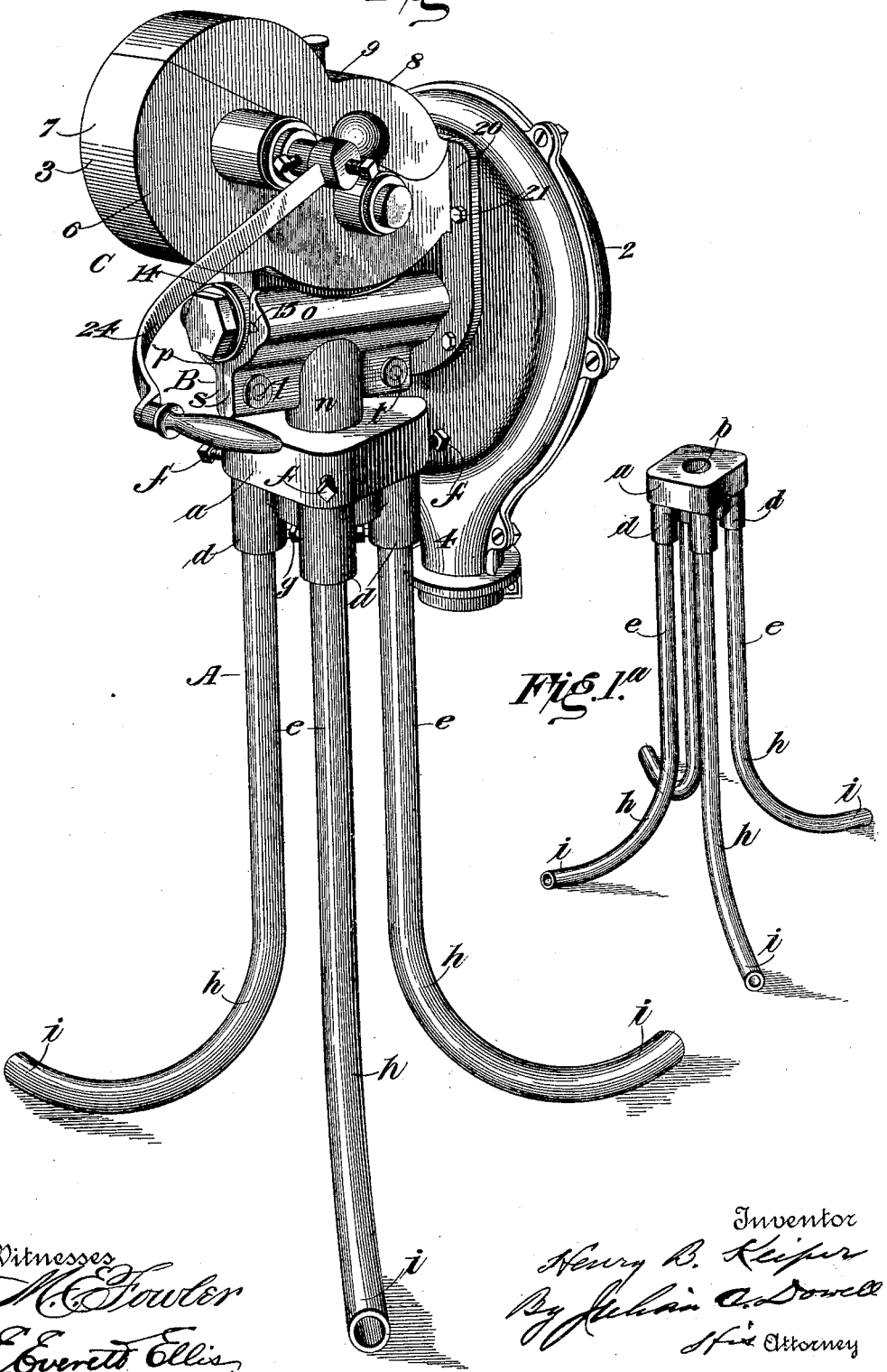

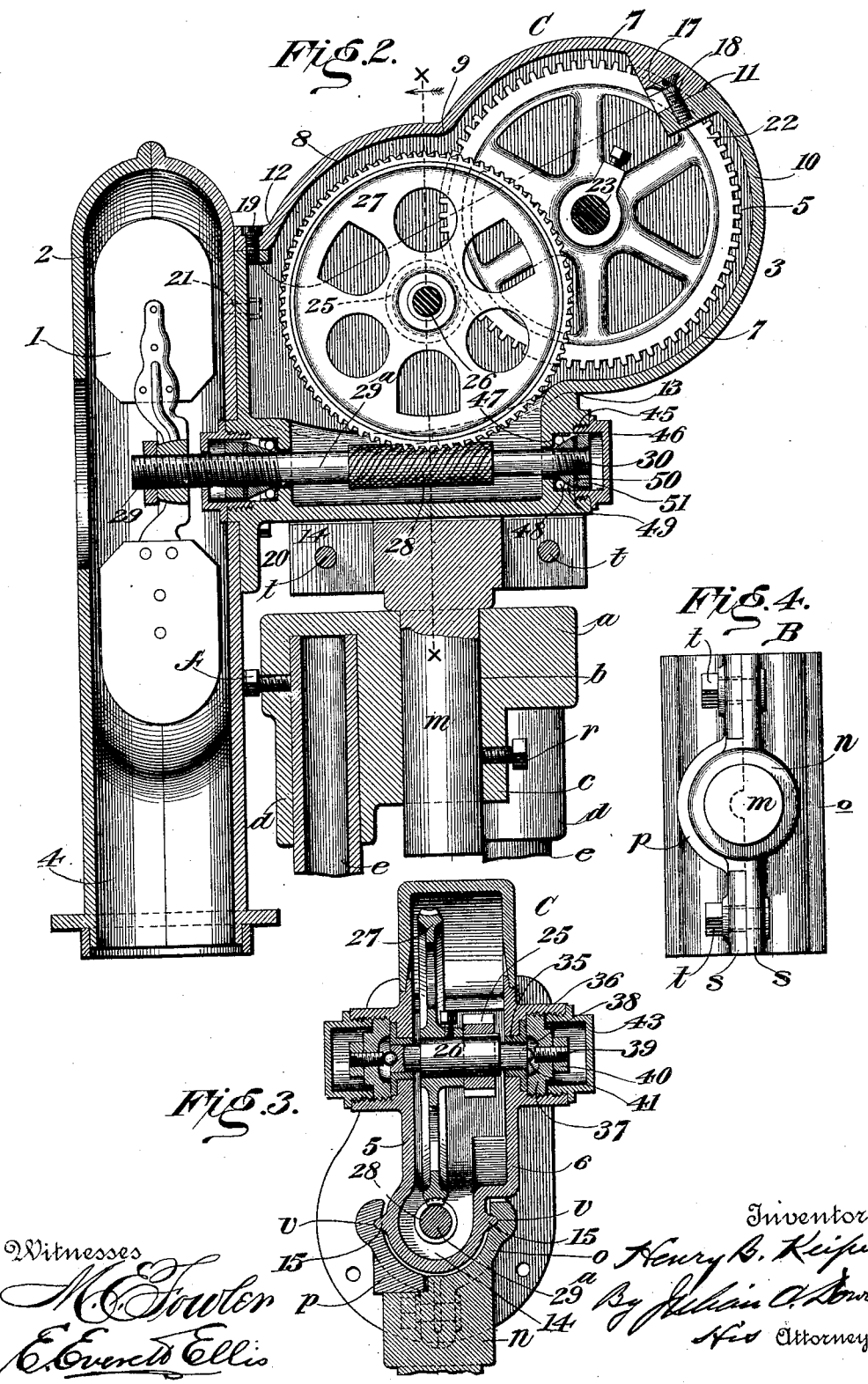

HENRY B. KEIPER, OF LANCASTER, PENNSYLVANIA.

ROTARY BLOWER.

No. 804,860. Specification of Letters Patent. Patented Nov. 21, 1905.

Application filed June 18, 1901. Renewed April 10, 1905. Serial No. 254,722.

*To all whom it may concern:*

Be it known that I, HENRY B. KEIPER, a citizen of the United States, residing at Lancaster, in the county of Lancaster and State of Pennsylvania, have invented certain new and useful Improvements in Rotary Blowers; and I do hereby declare the following to be a full, clear, and exact description of the invention, such as will enable others skilled in the art to which it appertains to make and use the same.

This invention relates to rotary blowers; and it consists substantially in the improvements hereinafter more particularly described, and pointed out in the claims.

In a former application filed by me on the 10th day of June, 1901, Serial No. 63,983, I have shown and described a certain embodiment of combined gearing and casing therefor comprising a main or driven shaft for operating a blower or other device, a train of driving-gears for said shaft, the wheels whereof are parallel with the shaft and with each other, and a transversely-divided inclosing casing in separable longitudinal parts in which the said shaft and gears have their bearings, whereby the movable or rotatable elements or parts are coöperatively arranged and housed in compact form, so as to economize both in space consumed and material employed in the construction. Also in each of the former Letters Patent granted to me on the 11th day of June, 1901, and numbered 676,322, 676,323, and 676,324, respectively, I have shown a somewhat similar embodiment of combined gearing and inclosing casing therefor, each of such embodiments, however, possessing certain special characteristics or features of construction differentiating it from the others. In the construction or embodiment covered by my other pending application referred to I preferably dispense with the worm and worm-wheel shown and described in each of my above-named Letters Patent, and as a direct connection between the main or driven shaft and operating-gearing I substitute a beveled pinion mounted on said shaft and engaged and operated by a similar pinion arranged at an angle thereto and in turn operated from said gearing. Also in my other pending application the inclosing casing for the gearing is provided at proper points with suitable bearings for the main or driven shaft, as well as for the ends or journals of the axles or shafts of the several wheels of the gear-train, and said wheels are constructed in any suitable way to successively communicate motion from one to the other. In said embodiment also the inclosing casing for the gearing is preferably transversely divided into separable or detachable sections on substantially a horizontal line, (as distinguished from the vertical divisional line of my several former patents referred to,) and said inclosing casing may or may not be provided with means for the introduction of a lubricant to the interior thereof for the purpose of keeping the engaging or operative faces of the inclosed gear-train well oiled or lubricated.

In my present invention I may employ either one of the embodiments of combined gearing and inclosing casing therefor hereinbefore referred to; but I have herein represented substantially the embodiment of gearing shown in each of said former Letters Patent combined with an inclosing casing of the form shown and described in my other pending application, it being understood that my present invention is intended to comprehend or include different or various combinations of these said associated elements either in entirety or in separate or special features of each.

The present invention has for its object to provide a rotary blower, together with a gearing and inclosing casing therefor, combined with a portable stand or support, the whole being arranged or disposed in compact form, so as to occupy but small space either in use or in transportation, and possessing the characteristics of great strength, durability, and ready separability of the several parts or elements thereof.

A further object is to provide means whereby the superstructure (consisting of the fan and its casing, with the gearing and its casing) is detachably mounted upon the stand or support therefor, and also whereby the said superstructure is longitudinally adjustable back and forth within certain limits to permit changes of position thereof incident to different or varying requirements in use.

A still further object of the present invention is to provide simple and effective means whereby the superstructure is readily adjusted to different heights to suit the "reach" of different operators and for other purposes;

and also whereby said superstructure may be brought to different circular adjustments horizontally, substantially as will hereinafter be more particularly set forth.

The above and additional objects I attain by means substantially such are illustrated in the accompanying drawings, wherein—

Figure 1 is a view in perspective of the entire structure embodying my present invention, the said figure indicating the machine all ready for use. Fig. 1ª is also a perspective view, on a smaller scale, of a modified form of the stand or support for the superstructure. Fig. 2 is an enlarged vertical central longitudinal sectional view of the superstructure or blower and combined gearing and casing therefor, together with the head or upper portion of the stand or support for said superstructure, the said head or upper portion being shown as broken off. Fig. 3 is a vertical transverse sectional view on the line $x\ x$, Fig. 2, looking toward the left, the fan-casing, together with the head or upper portion of the stand or support, being removed. Fig. 4 is a bottom plan view of the combined or integral clamp and supporting-post for securing the superstructure in position upon the stand or support.

Referring specifically to the several parts of the drawings, I will first proceed to describe the stand or support and then follow with a detailed description of the different elements constituting the superstructure, as well as the attaching means therefor, and the several adjusting devices or means. Thus, as shown in Figs. 1 and 2, the said stand or support is designated as a whole at A and is preferably in the form of a tripod, or, if desired, the same may be formed or provided with four or more legs, as shown in Fig. 1ª. The said stand or support is constructed of any suitable material, preferably metal, and comprises a head or top piece $a$, substantially of triangular or quadrangular shape in top plan and having therein a central hole or opening $b$.

The head is preferably increased in thickness at said opening or formed with a boss $c$, and the head or top piece is also formed or provided on its under side at or near the angles or corners thereof with sockets $d$, each for the reception of the upper end of one of the legs $e$, as shown. The head or top piece is provided at each of its corners or angles with a set-screw $f$, and each of the sockets $d$ is also provided in its side with a similar set-screw $g$, the said set-screws $f$ and $g$ being for the purpose of stability and preventing turning of the legs within the sockets during the time the machine is in action or operation. By means of said screws adjustments of the legs can also be effected when desired. It will thus be seen that the vertical portions of the legs $e$ are brought within small compass, while it will also be observed that the lower ends thereof are bent or curved outwardly at $h$, so as to provide feet $i$, covering an ample base and furnishing secure bracing. The said legs may be constructed of any suitable material, but are preferably of gas-pipe or the like for the purposes of lightness and strength. Fitting within or passing down through the central opening $b$ of the said head or top piece $a$ is a post or stem $m$, having a head-piece $n$, the two being preferably integral with each other and with one of the side portions $o$ of a clamp B, the other or detachable side portion $p$ of said clamp being practically a duplicate or counterpart of the first. The said post and clamp constitute the means by which the superstructure is mounted in place or position upon the stand or support A, and the head or top piece $a$ is provided at one side with a set-screw $r$, by means of which the said superstructure is held or maintained at different heights or vertical positions after raising or lowering the said post or stem $m$ within the opening $b$ of head $a$. It will of course be understood that by loosening said screw $r$ the superstructure can be turned or adjusted to any desired point or position in a horizontal plane. The side portions $o$ and $p$ of the clamp B are each parti-cylindrical in shape and extend horizontally a suitable distance to either side of the post, as shown, and they are formed with integral pendent or vertical flanges $s$, which abut or fit together closely and are securely held in rigid relation by suitable means, as by headed screw-bolts or pins $t$. (See Fig. 4.) Each of said side portions of the clamp B is formed with an inner longitudinal groove $v$, and when the superstructure C is mounted in place within said clamp the said grooves serve to receive corresponding longitudinal ribs or tongues formed on opposite sides of the lower cylindrical portion of the inclosing casing for the gearing, as will be described. In reference to the said superstructure C it will be understood that the same comprises or includes a rotary fan or blower 1 and an inclosing casing 2 therefor, together with the operating-gear and its housing or inclosing casing 3, the two said casings being united or fastened together, as will be presently described. The said fan or blower and its inclosing casing may be of any ordinary construction, but is preferably of the form shown in my former patent, No. 676,323, referred to, while the operating-gear for the fan may also be of any desired arrangement, but is preferably of the same general embodiment of either one of my aforesaid Letters Patent. In the present case, however, I prefer the same character of inclosing casing for the operating-gearing as is shown and described in my other pending application, although in some instances a casing similar to those shown in my said patents may be employed. Thus, as shown more particularly in Fig. 2, the fan-casing 2 is in two parts or sections suitably joined together vertically, and, as shown more clearly in Fig. 1, said casing is formed at its lower part with a neck 4 for the attachment of suitable tubing or piping (not shown) for connecting the blower with any suitable place, as the hearth of a forge, (not shown,) for instance, at which the air-blast produced by the fan is to be directed or delivered.

The housing or inclosing casing 3 for the operating-gearing comprises two side pieces 5 and 6, which are to a certain extent duplicates or counterparts of each other, in that they are each curved or rounded at 7 to conform as closely as possible to the general contour or configuration presented by the inclosed gear-train within, each of said side pieces being also curved or rounded on their upper edges at 8, the two curves joining or uniting with each other in a suitable angle at 9. The said side pieces 5 and 6 are connected or joined together integrally by a wall or body portion 10, which except for the transverse division of said housing or casing on the line 11, Fig. 2, is practically continuous between the points 12 and 13, (also Fig. 2,) and which wall or body portion follows the general shape or configuration above mentioned with regard to the said side pieces 5 and 6. The said housing or casing 3 is also formed at its lower part with an integral longitudinal tubular or swelled portion 14, which is set inwardly somewhat from side piece 6 and which projects somewhat beyond side piece 5, (see Fig. 2,) said tubular or swelled portion being preferably of length substantially equal to or somewhat in excess of the side portions $o$ and $p$ of the clamp B, as shown. This tubular portion 14 is received between said side portions of the clamp, and it is formed on opposite sides thereof with the longitudinal ribs or tongues 15, which are received in the grooves $v\ v$ of said clamp B. (See Fig. 3.) It will thus be seen in what manner the superstructure C is held rigidly in place upon the stand or support, and it is of course apparent that by partially unscrewing the bolts or pins $t$ the said superstructure C may be adjusted longitudinally between the side portions of clamp B for a limited distance to suit any requirement therefor. The said inclosing casing 3 is thus divided into two separable sections, of which the upper one constitutes a cover or lid, which at the outer end of the casing is provided with an inner notched projection 17, slipping over an adjustable screw 18, fitting in a similar inner projection of the lower casing-section, while at the innermost end of said casing fastening-screws 19 are employed to secure the cover-section in place. Also formed at the innermost part of inclosing casing 3 is an integral plate 20, to which attachment of the casing for the fan or blower is effected by means of screws 21, as shown. This latterly-described construction of parts is substantially the same as is employed in my other pending application, and no further specific reference thereto is required.

The operating-gearing for the fan or blower comprises, preferably, in this instance a main spur-gear 22, the shaft 23 of which is provided with an operating crank or handle 24, and said gear 22 engages with a pinion 25 on shaft 26 of a worm-wheel 27, which in turn engages or meshes with a worm 28 on a main or driven shaft $29^a$, each end of the latter being screw-threaded, as shown at 29 and 30, and the inner end whereof extends into the inclosing casing for the fan and having the said fan secured thereto in any suitable manner, as shown in Fig. 2. The ends or journals of each of the gear-wheel shafts are supported in the side pieces 5 and 6 of the inclosing casing 3 for the gearing, and the main or driven shaft 29 is supported in the ends of the lower tubular portion of said casing, it being understood that the said ends or journals of each of the shafts referred to may have either plain or antifriction bearings, as found most desirable in practice. For each journal of the shaft 26 of the worm-wheel herein I preferably employ a phosphor-bronze bushing 35, fitting in the side pieces 5 and 6 of the inclosing casing 3 and screwing into an interiorly-threaded outer boss 36. On each of said side pieces is a disk 37, recessed at 38 on its inner face and having a central threaded opening, in which is a hardened-steel screw 39, on the outer end of which is a jam-nut 40, which screws up against the outer side of the disk for the purpose of taking up lateral and endwise motion, as is clear. The inner end of each of said screws 39 bears upon or against a ball 41, seated in a recess in the corresponding end of the said shaft 26, and as the said inner ends of the said screws are shown as flat very perfect bearings for the ends of said shaft are obtained irrespective of the particular points at which the ends of the screws contact with the said balls. Said screws are adapted at their outer ends to receive a screw-driver either for their insertion or withdrawal, as well as for their adjustment, and fitting into each of the said bosses 36 on the casing 3 is a dust-cap 43, which is screwed up against the disk, the latter in turn being screwed up tightly against the said phosphor-bronze bushing 35, and thus is a double lock obtained between these parts.

The driven or worm shaft is supported at the ends of the lower tubular portion of said inclosing casing 3, as shown, said ends being of increased thickness and having openings 45 for the passage of the journals of said shaft, said openings having different diameters, also as shown, (see Fig. 2,) and being interiorly threaded to receive outer closures or dust-caps 46. Inserted in each of said openings, at the base thereof, is a pressed-steel cup 47, forming a raceway for the sets of balls 48, and screwing onto the said worm-shaft are the adjusting-cones 49 for said balls, behind which are the washers 50, followed by the jam or lock nuts 51, the general construction and purpose of all of which is fully apparent.

As before stated, I do not wish to be understood as limiting myself to any particular form of support or bearing for either the shafts of the gear-wheels or the driven shaft, since either plain or any suitable form of ball or other antifriction bearings therefor may be used, accordingly as may be desired in practice.

From the foregoing it will be seen that my improved combined rotary blower and stand or support therefor is exceedingly cheap and simple, besides being easily taken apart and again put together whenever desired, and it will also be seen in what manner adjustments of the superstructure are made or effected. The operation of the parts takes place in an easy and noiseless manner and with the expenditure of but little labor on the part of the operator, and the several interior parts or elements are most thoroughly protected from injury, as well as from dust and dirt.

I do not limit myself to any of the precise details of construction and arrangement of parts or elements herein shown and described.

Having thus fully described my invention, what I claim as new, and desire to secure by Letters Patent of the United States, is—

1. In a blower, a stand or support, a superstructure detachably mounted thereon comprising a fan and casing therefor together with a combined operating-gearing and inclosing casing therefor, means permitting limited longitudinal adjustments of said superstructure, and means permitting both vertical and horizontal adjustments thereof, substantially as described.

2. In a blower, a tripod having a removable or detachable centrally-apertured head, and a superstructure detachably mounted on said head comprising a fan and casing therefor and a combined operating-gearing and inclosing casing therefor, said superstructure being mounted on a stem or post fitting said aperture, substantially as described.

3. In a blower, a tripod having an apertured head provided on its under side with sockets, supporting-legs removably and adjustably inserted in said sockets, and a superstructure mounted on a stem or post fitting the aperture in said head comprising a fan and casing therefor together with a combined operating-gearing and inclosing casing therefor, substantially as described.

4. In a blower, a stand or support having a head with an opening therein, a removable clamp mounted on a post adjustably secured in said opening, and a superstructure detachably supported by said clamp and comprising a fan and casing therefor together with a combined operating-gearing and inclosing casing therefor, substantially as described.

5. In a blower, a stand or support having a head with a removable clamp mounted thereon, means for adjusting said clamp in vertical and horizontal directions, and a superstructure detachably supported by the clamp and comprising a fan and casing therefor together with a combined operating-gearing and inclosing casing therefor, substantially as described.

6. In a blower, a tripod having a head, a removable clamp having a post adjustably secured in an opening in said head, and a superstructure detachably supported by the clamp and comprising a fan and casing therefor and a combined operating-gearing and inclosing casing therefor, substantially as described.

7. In a blower, a tripod having a head, a removable clamp adjustably mounted on said head, means for adjusting said clamp in vertical and circular horizontal directions, and a superstructure detachably supported by the clamp and comprising a fan and casing therefor and a combined operating-gearing and inclosing casing therefor, substantially as described.

8. In a blower, a tripod having a head provided on its under side with sockets, supporting-legs adjustably and detachably fitting in said sockets, a removable clamp mounted on said head, and a superstructure detachably supported by the clamp and comprising a fan and casing therefor and a combined operating-gearing and inclosing casing therefor, substantially as described.

9. In a blower, a stand or support having a head provided with an opening therethrough, a clamp having a post or stem adjustably fitting said opening, and a superstructure detachably supported by said clamp and comprising a fan and casing therefor and a combined gearing and inclosing casing therefor, substantially as described.

10. In a blower, a stand or support having a head provided with an opening therein, a clamp having a post adjustably fitting said opening and constructed of two substantially parti-cylindrical sections each having a longitudinal groove therein, and a superstructure having a tubular portion having ribs or tongues fitting said grooves, said superstructure further comprising a fan and casing therefor and a combined operating-gearing and inclosing casing therefor, substantially as described.

11. In a blower, a stand or support having a head provided with an aperture, a vertical post or stem adjustably secured in said aperture, a two-part clamp mounted on said post, one member of which is integral with said post, and a blower-casing having a portion thereof gripped between the members of said clamp, substantially as described.

12. In a blower, a stand or support having a head provided with an opening therein, a vertical post or stem adjustably fitting said opening, a horizontally-disposed clamp mounted on said post consisting of two substantially parti-cylindrical members having pendent vertical flanges bolted together and having internal longitudinal grooves, and a blower-casing having a portion provided with external ribs fitting said grooves in the clamp members, substantially as described.

In testimony whereof I affix my signature in presence of two witnesses.

HENRY B. KEIPER.

Witnesses:
M. G. SWAN,
WALTER A. MILLER.